(No Model.)

D. H. CHURCH.
PENDANT FOR WATCH CASES.

No. 328,289. Patented Oct. 13, 1885.

Witnesses.
H Brown
R. J. Powers

Inventor
D. H. Church
by Wright & Brown
Attys.

UNITED STATES PATENT OFFICE.

DUANE H. CHURCH, OF WALTHAM, MASSACHUSETTS.

PENDANT FOR WATCH-CASES.

SPECIFICATION forming part of Letters Patent No. 328,289, dated October 13, 1885.

Application filed December 30, 1884. Serial No. 151,532. (No model.)

*To all whom it may concern:*

Be it known that I, DUANE H. CHURCH, of Waltham, in the county of Middlesex and State of Massachusetts, have invented certain Improvements in Watch-Cases, of which the following is a specification.

This invention has for its object to provide improved means for tightly closing the outer end of the pendant of a watch-case to prevent the entrance of dust through the cavity containing the winding and setting stem; and it consists in the combination of the winding-stem having a shoulder near its outer end near the winding-crown, a disk or collar on the stem supported by said shoulder, and a nut screwed onto the externally-threaded end of the pendant and provided with an inwardly-projecting flange which bears on the disk or collar on the stem and presses the latter against the end of the pendant, thus making a tight joint around the stem when the nut is screwed to place, the nut being partially unscrewed to release the stem and enable it to perform the winding operation, and wholly unscrewed to enable the stem to be pulled outwardly to adapt it for hand-setting, all of which I will now proceed to describe.

Figure 1:
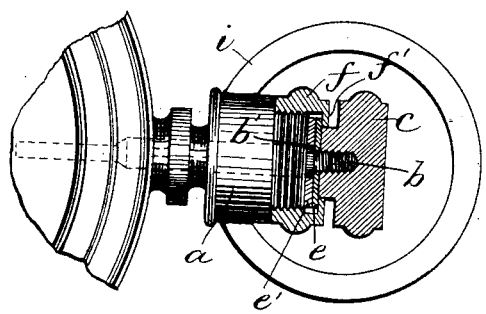
Figure 2:
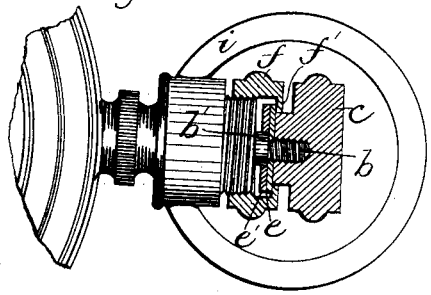
Figure 3:
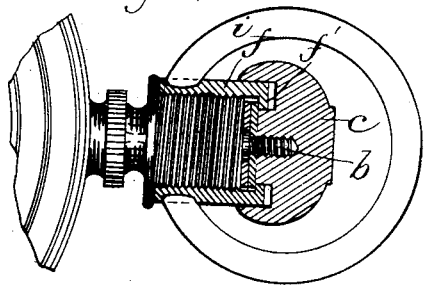

Of the accompanying drawings, forming a part of this specification, Figure 1 represents an enlarged side view of a watch-case pendant, showing the flanged nut, the winding-crown, and the disk or collar on the shouldered stem in section, the nut being screwed to place. Fig. 2 represents a similar view showing the nut partially unscrewed to enable the stem to be rotated freely for the purpose of winding. Fig. 3 represents a view showing the flanged nut extended to receive the ends of the pendant bow.

The same letters of reference indicate the same parts in all the figures.

In the drawings, *a* represents the externally screw-threaded pendant of a stem winding and setting watch.

*b* represents the winding and hand-setting stem passing through the pendant, as usual. The outer end of the stem is reduced and provided with a screw-thread of a pitch opposite to that on the pendant, a shoulder, *b'*, being formed on the stem by the reduction of its outer end.

The crown *c*, by which the stem is rotated in winding and setting the watch, is screwed upon the reduced and threaded end of the stem, the pitch of the screw-thread thereon being such that the rotation of the crown in the direction required for winding will not unscrew it from the stem.

*e* represents a metallic disk or collar interposed between the shoulder *b'* and the crown *c*, the disk being of greater diameter than the inner end of the crown that bears against it.

*f* represents a nut screwed upon the pendant, and provided with an inwardly-projecting flange, *f'*, which bears upon the margin of the disk *e*, and when screwed to place, as shown in Fig. 1, presses the disk against a washer, *e'*, of leather or other yielding material, which is thus pressed against the end of the pendant, the stem being held firmly by the pressure of the disk *e* against its shoulder *b'*.

It will be seen that the disk pressed inwardly by the nut against the shoulder of the stem, and the yielding washer pressed by the disk against the end of the pendant, tightly close the outer end of the pendant against the admission of dust, and even water, should the watch be submerged. I do not limit myself, however, to the employment of the yielding washer, for the latter may be omitted without departing from the spirit of my invention, the disk *e* being pressed directly against the end of the pendant by the nut *f*.

When the stem *b* is to be rotated to wind the watch, the nut *f* should be unscrewed, as shown in Fig. 2, sufficiently to enable the stem to rotate easily.

When the described improvement is used in watches in which the stem is drawn outwardly to adapt it to operate the hand-setting mechanism, the nut *f* may be entirely unscrewed from the pendant to permit the outward movement of the stem.

Fig. 3 shows the nut *f*, made of sufficient length to receive the ends of the pendant-bow *i*, so that the bow may be used as a handle to rotate the nut *f*, the bow being sprung into sockets formed in the nut.

The disk or collar *e* may be rigidly attached to the stem instead of bearing against the shoulder thereon, or it may be attached to the crown *c* instead of to the stem.

I claim—

1. In a stem winding and setting watch-case, the combination of the threaded pendant, the stem having the crown $c$ and the disk or collar $e$, and the flanged nut screwed upon the pendant and bearing on the disk or collar on the stem, as set forth.

2. In a stem winding and setting watch-case, the combination of the externally-threaded pendant, the shouldered stem having a disk or collar bearing on the shoulder thereof, and the flanged nut screwed upon the pendant and bearing upon the disk on the stem, as set forth.

3. The combination of the threaded pendant, the stem having the crown $c$ and disk or collar $e$, the flanged nut screwed upon the pendant and bearing on the disk or collar on the stem, and the pendant-bow secured to the nut, as set forth.

In testimony whereof I have signed my name to this specification, in the presence of two subscribing witnesses, this 24th day of December, 1884.

DUANE H. CHURCH.

Witnesses:
C. F. BROWN,
H. BROWN.